US011126609B2

United States Patent
Elkherj et al.

(10) Patent No.: US 11,126,609 B2
(45) Date of Patent: *Sep. 21, 2021

(54) FEATURE CLUSTERING OF USERS, USER CORRELATION DATABASE ACCESS, AND USER INTERFACE GENERATION SYSTEM

(71) Applicant: Palantir Technologies Inc., Denver, CO (US)

(72) Inventors: Matthew Elkherj, Menlo Park, CA (US); Xavier Falco, London (GB); Pierre Cholet, New York, NY (US); Giulio D'Ali' Aula, Milan (IT); Andrew Ehrich, New York, NY (US)

(73) Assignee: Palantir Technologies Inc., Denver, CO (US)

( * ) Notice: Subject to any disclaimer, the term of this patent is extended or adjusted under 35 U.S.C. 154(b) by 33 days.

This patent is subject to a terminal disclaimer.

(21) Appl. No.: 16/198,614

(22) Filed: Nov. 21, 2018

(65) Prior Publication Data
US 2019/0108249 A1 Apr. 11, 2019

Related U.S. Application Data

(63) Continuation of application No. 15/239,585, filed on Aug. 17, 2016, now Pat. No. 10,140,327.
(Continued)

(51) Int. Cl.
*G06Q 30/02* (2012.01)
*G06F 16/23* (2019.01)
(Continued)

(52) U.S. Cl.
CPC ............ *G06F 16/23* (2019.01); *G06F 16/248* (2019.01); *G06F 16/25* (2019.01);
(Continued)

(58) Field of Classification Search
CPC ........ G06F 16/23; G06F 16/25; G06F 16/248; G06Q 30/0255; G06Q 30/0271; G06Q 30/0282; G06Q 50/01
See application file for complete search history.

(56) References Cited

U.S. PATENT DOCUMENTS 6,578,056 B1 * 6/2003 Lamburt ................. G06F 16/25
 715/205
8,751,427 B1 6/2014 Mysen et al.
(Continued)

FOREIGN PATENT DOCUMENTS

EP 3136332 3/2017
WO WO 1997/024687 A1 * 10/1997 ............. G06Q 30/00

OTHER PUBLICATIONS

Secure Method for De-Identifying and Anonymizing Large Panel Datasets, Ajina et al., 22nd International Conference on Information Fusion Ottawa, Canada—Jul. 2-5, 2019.*
(Continued)

*Primary Examiner* — David J Stoltenberg
(74) *Attorney, Agent, or Firm* — Knobbe, Martens, Olson & Bear, LLP

(57) ABSTRACT

Methods, systems, and apparatus, including computer programs encoded on computer storage media, for a feature clustering of users, user correlation database access, and user interface generation system. The system can obtain information stored in different databases located across geographic regions, and determine unique users from the different information. The information can be included in unique records in the databases, with each record describing a particular user, and with each user described with imperfect identifying information. The system can analyze the different information utilizing machine learning models, and can associate each record with a particular unique user. The system can obtain identifications of items associated with (Continued)

each user, and determine the propensity of the user to disassociate with one or more items, or determine likelihoods of future association with different items not presently associated with the user.

20 Claims, 8 Drawing Sheets

Related U.S. Application Data

(60) Provisional application No. 62/209,235, filed on Aug. 24, 2015.

(51) Int. Cl.
    G06F 16/25    (2019.01)
    G06F 16/248   (2019.01)
    G06Q 50/00    (2012.01)

(52) U.S. Cl.
    CPC ..... *G06Q 30/0255* (2013.01); *G06Q 30/0271* (2013.01); *G06Q 30/0282* (2013.01); *G06Q 50/01* (2013.01)

(56) References Cited

U.S. PATENT DOCUMENTS

| | | | | |
|---|---|---|---|---|
| 8,930,204 | B1* | 1/2015 | Igoe | G06Q 30/02 |
| | | | | 705/2 |
| 9,953,095 | B1* | 4/2018 | Scott | G06F 16/955 |
| 10,140,327 | B2* | 11/2018 | Elkherj | G06Q 30/0255 |
| 10,242,019 | B1* | 3/2019 | Shan | G06Q 30/02 |
| 2004/0034558 | A1 | 2/2004 | Eskandari | |
| 2005/0108536 | A1* | 5/2005 | Karimisetty | G06F 21/6227 |
| | | | | 713/176 |
| 2005/0114201 | A1* | 5/2005 | Walsh | G06Q 10/06 |
| | | | | 709/200 |
| 2005/0262190 | A1* | 11/2005 | Mamou | G06F 16/254 |
| | | | | 709/203 |
| 2006/0020641 | A1* | 1/2006 | Walsh | G06Q 10/10 |
| 2007/0136212 | A1 | 6/2007 | Carpenter et al. | |
| 2007/0162501 | A1* | 7/2007 | Agassi | G06Q 30/0201 |
| 2008/0027980 | A1 | 1/2008 | Owens et al. | |
| 2008/0243815 | A1* | 10/2008 | Chan | G06Q 30/0641 |
| 2008/0262897 | A1 | 10/2008 | Howarter et al. | |
| 2009/0157449 | A1 | 6/2009 | Itani et al. | |
| 2010/0161377 | A1 | 6/2010 | Hines et al. | |
| 2011/0004830 | A1* | 1/2011 | Von Kaenel | G06F 16/29 |
| | | | | 715/751 |
| 2011/0261049 | A1* | 10/2011 | Cardno | G06Q 10/10 |
| | | | | 345/419 |
| 2012/0059707 | A1* | 3/2012 | Goenka | G06Q 30/0275 |
| | | | | 705/14.41 |
| 2012/0191714 | A1* | 7/2012 | Datar | G06F 16/9535 |
| | | | | 707/737 |
| 2012/0191715 | A1 | 7/2012 | Ruffner et al. | |
| 2012/0239466 | A1 | 9/2012 | Hu et al. | |
| 2012/0254186 | A1* | 10/2012 | Winner | G06F 16/29 |
| | | | | 707/740 |
| 2012/0278317 | A1* | 11/2012 | Spiegel | H04L 51/32 |
| | | | | 707/731 |
| 2013/0046778 | A1* | 2/2013 | Higgins | G06F 16/9535 |
| | | | | 707/767 |
| 2013/0124474 | A1 | 5/2013 | Anderson | |
| 2014/0006166 | A1 | 1/2014 | Chiang et al. | |
| 2014/0012870 | A1* | 1/2014 | Wark | G06Q 10/101 |
| | | | | 707/769 |
| 2014/0040068 | A1 | 2/2014 | Mohan et al. | |
| 2014/0122229 | A1 | 5/2014 | Clark et al. | |
| 2014/0257890 | A1 | 9/2014 | Polonsky et al. | |
| 2014/0279757 | A1 | 9/2014 | Shimanovsky et al. | |
| 2014/0358735 | A1* | 12/2014 | Robinson | G06Q 30/0641 |
| | | | | 705/27.1 |
| 2015/0006559 | A1* | 1/2015 | Meierhoefer | G06F 16/00 |
| | | | | 707/758 |
| 2015/0026181 | A1* | 1/2015 | Milton | G06F 16/29 |
| | | | | 707/737 |
| 2015/0026597 | A1* | 1/2015 | Gadamsetty | H04L 51/046 |
| | | | | 715/753 |
| 2015/0154269 | A1* | 6/2015 | Miller | G06F 16/2477 |
| | | | | 715/780 |
| 2015/0193855 | A1 | 7/2015 | Costelloe | |
| 2015/0205842 | A1* | 7/2015 | Jain | G06F 16/215 |
| | | | | 707/732 |
| 2015/0220835 | A1 | 8/2015 | Wilson et al. | |
| 2015/0220836 | A1 | 8/2015 | Wilson et al. | |
| 2015/0312605 | A1 | 10/2015 | Hoctor et al. | |
| 2016/0048900 | A1* | 2/2016 | Shuman | G06Q 30/0204 |
| | | | | 705/7.33 |
| 2016/0078100 | A1* | 3/2016 | Anderson | G06F 16/2228 |
| | | | | 707/690 |
| 2016/0105518 | A1* | 4/2016 | Rosenshine | G06Q 30/0246 |
| | | | | 709/206 |
| 2016/0117736 | A1 | 4/2016 | Dasdan et al. | |
| 2016/0164974 | A1* | 6/2016 | Lavee | G06Q 30/0251 |
| | | | | 707/722 |
| 2016/0171510 | A1* | 6/2016 | Fanous | G06Q 30/0201 |
| | | | | 705/7.34 |
| 2016/0191639 | A1* | 6/2016 | Dai | G06Q 30/0267 |
| | | | | 709/204 |
| 2016/0203509 | A1 | 7/2016 | Sharp, III et al. | |
| 2016/0283983 | A1* | 9/2016 | Kalb | G06Q 30/0269 |
| 2016/0292238 | A1 | 10/2016 | Qiao et al. | |
| 2016/0335603 | A1* | 11/2016 | Davar | G06F 16/28 |
| 2017/0060930 | A1 | 3/2017 | Elkherj et al. | |
| 2017/0098197 | A1* | 4/2017 | Yu | G06Q 30/02 |
| 2018/0329935 | A1* | 11/2018 | Mugali | G06F 16/282 |
| 2019/0108249 | A1* | 4/2019 | Elkherj | G06F 16/248 |

OTHER PUBLICATIONS

Official Communication for European Patent Application No. 16185236.3 dated Oct. 11, 2017.

Official Communication for European Patent Application No. 16185236.3 dated Nov. 21, 2016.

Notice of Allowance for U.S. Appl. No. 15/239,585 dated May 25, 2017.

Official Communication for U.S. Appl. No. 15/239,585 dated Mar. 1, 2017.

Official Communication for U.S. Appl. No. 15/239,585 dated Dec. 23, 2016.

Official Communication for U.S. Appl. No. 15/239,585 dated Jul. 12, 2018.

Official Communication for U.S. Appl. No. 15/239,585 dated Mar. 7, 2018.

* cited by examiner

CLIENT RESEARCH

504 First Name: 506 Last Name: 502 Maryse Graham 508

| First Name | Last Name | View | ID | Client Number |
|---|---|---|---|---|
| First Names | Last Names | V360 | P1576499 | 365339999 |
| | | V360 | P1576199 | 299909999 |
| | | V360 | P482713299 | 2842749999 |
| | | V360 | A445334599 | 431289999 |
| | | V360 | A49556299 | 54529999 |
| | | V360 | A346399 | 5174599999 |
| | | V360 | A318456599 | 1346299999 |
| | | V360 | A403454599 | 5237099999 |
| | | V360 | A50046499 | 3012069999 |
| | | V360 | P12604599 | 5895899999 |
| | | V360 | P5335499 | 448459999 |
| | | V360 | A3151299 | 2393899999 |
| | | V360 | P525699 | 1803589999 |
| | | V360 | P58399 | 1123789999 |

CONTRACTS AND CLAIMS
Summary of Services

| TYPE | STATUS | NUM CNT | DATE STARTED | DATE FINISHED | PRIME CUR | CHURN SCORE 704 | AGENT 706 | ID | YEAR | CLAIMS |
|---|---|---|---|---|---|---|---|---|---|---|
| Service 4 | Current | 3204948704 | 04-08-2006 | | 447 | Low | AGENT 1 | 348772 | 2010 | 1 |
| Service 3 | Current | 2497213304 | 07-07-2004 | | 187 | Medium | AGENT 1 | 348772 | | |
| Service 1 | Current | 34872900045 | 25-10-1999 | | N/A | High | AGENT 1 | 348772 | | |

CHURN FACTORS 708
- Purchased new car in last 12 months
- Average agent commission
- Absence of theft and fire coverage
- Absence of coverage of collateral damages for auto insurance 712

RETENTION FACTORS 710
- Annual Subscription
- Stable Contract for Previous 4 years 714

INTERACTIONS WITH CLIENT 720
Recent Interactions 25-10-2014 09.30.00  ○ Agent Mailing
722      Agent mailed Packet 1 to client 09-10-2014 00.00.00  ○ Agent Mailing
Lorem ipsum Significant Interactions 724
NEGATIVES  POSITIVES

Agent Analysis on 04-03-2010
Lorem ipsum dolor sit amet, at omnes urbanitas eam, ne aliquam minimum mel. Vivendum rationibus te mea. Mel cu quaeque accommodare, zril dolorem consequat an pri. Facer homero ex cum, no qui atqui persecuti, putant delectus nec eu.

FEATURE CLUSTERING OF USERS, USER CORRELATION DATABASE ACCESS, AND USER INTERFACE GENERATION SYSTEM

CROSS-REFERENCE TO RELATED APPLICATIONS

Any and all applications for which a foreign or domestic priority claim is identified in the Application Data Sheet as filed with the present application are hereby incorporated by reference in their entirety under 37 CFR 1.57.

BACKGROUND

Large businesses can have locations of the business spread over large geographic areas, with each location interacting with people that purchase products, or subscribe to services, offered by the business. For instance, a particular business can have different locations, with each location interacting with people located in the same geographic area. Often times, each location can maintain records of who is purchasing products or services, with each location entering details related to persons purchasing products or services, and the associated purchased products or services.

SUMMARY

A described system can obtain information stored in databases located across a multitude of geographic regions, and determine unique users, or entities, from the information. The information can be included in unique records, or entries in a database, with each record or entry describing a particular user, or entity, with each user, or entity, described with imperfect identifying information (e.g., name, address, phone number, email address, familial relationships, services, and so on). The system can analyze the information utilizing machine learning models, and can associate each record, or entry, with a particular user, or entity. The system can obtain identifications of items associated with each user, or entity, and determine the propensity of the user, or entity, to disassociate with one or more items, or a likelihood of future association with different items not presently associated with the user, or entity.

The system can generate user interfaces describing each user, or entity, and items presently associated with the user, or entity. A reviewing user can quickly identify items likely to be associated with the user, and items that the user is likely to disassociate with. Actions can be taken by the reviewing user to effect, or discourage, the associating, or disassociating, by the user.

Due to the inaccuracy and inefficiencies of entering user record information in computers, along with the technical hurdles of coordinating multitudes (e.g., tens, hundreds, thousands) of employees to record, in a user interface of a computer using fillable forms for instance, each interaction with a user using identical information to describe the user, without the techniques described below, a company could never view easy to digest, yet complex, information about a particular user or multiple users (e.g., as illustrated in FIGS. 5-8). For instance, as will be described, the system can determine that multiple user records are actually associated with a same user. In this way, user records can be linked and information from each record associated with a same user, allowing a company to combine large quantities of records and obtain previously unobtainable snapshots of a user.

It has been noted that design of computer user interfaces "that are useable and easily learned by humans is a non-trivial problem for software developers." (Dillon, A. (2003) User Interface Design. MacMillan Encyclopedia of Cognitive Science, Vol. 4, London: MacMillan, 453-458.) The present disclosure describes various embodiments of interactive and dynamic user interfaces that are the result of significant development. This non-trivial development has resulted in the user interfaces described herein which may provide significant cognitive and ergonomic efficiencies and advantages over previous systems. The interactive and dynamic user interfaces include improved human-computer interactions that may provide reduced mental workloads, improved decision-making, reduced work stress, and/or the like, for a user. For example, user interaction with the interactive user interface via the inputs described herein may provide an optimized display of, and interaction with, graph data, image data, and/or other data, and may enable a user to more quickly and accurately access, navigate, assess, and digest the data than previous systems.

Further, the interactive and dynamic user interfaces described herein are enabled by innovations in efficient interactions between the user interfaces and underlying systems and components. For example, disclosed herein are improved methods of receiving user inputs (including methods of interacting with, and selecting, images, graphs, and other types of data), translation and delivery of those inputs to various system components, automatic and dynamic execution of complex processes in response to the input delivery, automatic interaction among various components and processes of the system, and automatic and dynamic updating of the user interfaces (to, for example, display the relevant data from various different applications and/or data sources). The interactions and presentation of data via the interactive user interfaces described herein may accordingly provide cognitive and ergonomic efficiencies and advantages over previous systems.

Various embodiments of the present disclosure provide improvements to various technologies and technological fields. For example, existing data aggregation and analysis technology is limited in various ways (e.g., limited in the types of applications or data sources the data may be drawn from, loss of data interactivity, etc.), and various embodiments of the disclosure provide significant improvements over such technology. Additionally, various embodiments of the present disclosure are inextricably tied to computer technology. In particular, various embodiments rely on detection of user inputs via graphical user interfaces, aggregation of data from different applications and data sources, and automatic processing, formatting, and display of the aggregated data via interactive graphical user interfaces. Such features and others (e.g., automatically determining an application or data source an inputted link is directed to, accessing the application or data source to retrieve and display the requested data, implementing interactivity of displayed data reflective of how the data would be displayed in its native application) are intimately tied to, and enabled by, computer technology, and would not exist except for computer technology. For example, the interactions with displayed data described below in reference to various embodiments cannot reasonably be performed by humans alone, without the computer technology upon which they are implemented. Further, the implementation of the various embodiments of the present disclosure via computer technology enables many of the advantages described herein, including more efficient interaction with, and presentation of, various types of electronic data.

Particular embodiments of the subject matter described in this specification can be implemented so as to realize one or more of the following advantages. A system can determine that one or more user records are each associated with a same person, even if the user records describe the person differently (e.g., different name, different address, and so on). The system therefore allows for insights into user records that might have errors associated with input (e.g., an employee entered a name incorrectly), or errors associated with out of date information (e.g., a person has a different address on two user records because he/she moved in the intervening time period). Additionally, the system can associate all user records with respective people, and/or combine all user records into a combined user record database, which can reduce the total storage space and reduce processing time when searching for user records or information about each person. After determining unique users from a large pool of electronic user records, the system can provide identifications of services (e.g., insurance policies, subscriptions to services) to recommend to each unique user, and also identifications of services at risk for cancellation by each unique user. The system generates user interfaces that enable a reviewing user (e.g., a sales analyst) to obtain a holistic view of each unique user, and also summary data of all similar unique users.

In general, one innovative aspect of the subject matter described in this specification can be embodied in methods that include the actions of obtaining, from the one or more electronic data sources each storing user records, information describing a plurality of users; determining, using the obtained information, a plurality of unique users and user records associated with the unique users; obtaining, for each unique user and from associated user records, identifications of services connected with the unique user and information describing features of the unique user; determining, for each unique user, user churn information indicating likelihoods of the unique user disconnecting from services connected with the unique user; determining, for each unique user, one or more recommended services for the unique user comprising: determining clusters to assign each unique user according to features of respective unique users, obtaining identifications of services connected with unique users that are included in a same cluster as the unique user, determining one or more of the obtained services that the unique user is not connected with, and assigning the determined services as the one or more recommended services for the unique user; and providing, for presentation in the interactive user interface, summary data describing one or more unique users.

Additional methods and features can include any of the following. Determining a particular unique user comprises determining that a plurality of user records, obtained from the one or more databases, each describe the particular unique user. Each user record identifies a different spelling of a name associated with the particular unique user, and wherein determining that the plurality of user records each describes the particular unique user comprises determining, using identifying information included in the plurality of user records, that a likelihood that the user records are associated with the particular unique user exceeds a threshold. A first user record of the plurality of user records does not include a name, and wherein determining that the plurality of user records each describes the particular unique user comprises: determining, using identifying information other than a name included in the plurality of user records, that a likelihood that the first user record is associated with the particular user exceeds a threshold. Each user record identifies, at least, a name associated with a unique user, and one or more services connected with the unique user. Determining services that a particular unique user is not connected with comprises determining services which greater than a threshold percentage of unique users included in the same cluster are connected with. The actions include receiving, from a user device, information identifying a particular unique user; obtaining information describing the particular unique user, wherein the information comprises user churn information associated with the particular unique user and recommended services for the particular unique user; and providing, for presentation in the interactive user interface, an identification of a service identified in the user churn information and an identification of a recommended service. The actions include providing, for presentation in the interactive user interface, analyses of descriptive text associated with interactions with the particular unique user, wherein the analyses indicate positive or negative interactions. The actions include receiving, from a user device, information identifying a particular cluster of a plurality of clusters, wherein each cluster is associated with particular unique users classified according to respective features of the particular unique users, and wherein the features are included in user records for each particular unique user; and providing, for presentation in the interactive user interface, summary data of services associated with the particular unique users. Providing summary data of services associated with the particular unique users comprises providing, for presentation, identifications of one or more services that are recommended for the particular unique users at greater than a threshold percentage; and providing a map of a geographic area that includes the particular unique users, wherein the map identifies concentrations of the particular unique users. The actions include receiving a selection of a particular recommended service; and updating the map of the geographic region to include concentrations of one or more unique users of the particular unique users that are not connected with the selected recommended service.

Additional embodiments of the disclosure are described below in reference to the appended claims, which may serve as an additional summary of the disclosure.

In various embodiments, computer systems are disclosed that comprise one or more hardware computer processors in communication with one or more non-transitory computer readable storage devices, wherein the one or more hardware computer processors are configured to execute the plurality of computer executable instructions in order to cause the computer system to operations comprising one or more aspects of the above-described embodiments (including one or more aspects of the appended claims).

In various embodiments, computer-implemented methods are disclosed in which, under control of one or more hardware computing devices configured with specific computer executable instructions, one or more aspects of the above-described embodiments (including one or more aspects of the appended claims) are implemented and/or performed.

In various embodiments, non-transitory computer-readable storage mediums storing software instructions are disclosed, wherein, in response to execution by a computing system having one or more hardware processors, the software instructions configure the computing system to perform operations comprising one or more aspects of the above-described embodiments (including one or more aspects of the appended claims).

Further, as described herein, various embodiments of the system may be configured and/or designed to generate user interface data useable for rendering the various interactive user interfaces described. The user interface data may be used by the system, and/or another computer system, device, and/or software program (for example, a browser program), to render the interactive user interfaces. The interactive user interfaces may be displayed on, for example, electronic displays (including, for example, touch-enabled displays).

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

FIG. 5 is an example user interface for selecting a user to receive associated summary data.

FIG. 7 is an example user interface of detailed data associated with the selected user.

Like reference numbers and designations in the various drawings indicate like elements.

DETAILED DESCRIPTION

Figure 1:
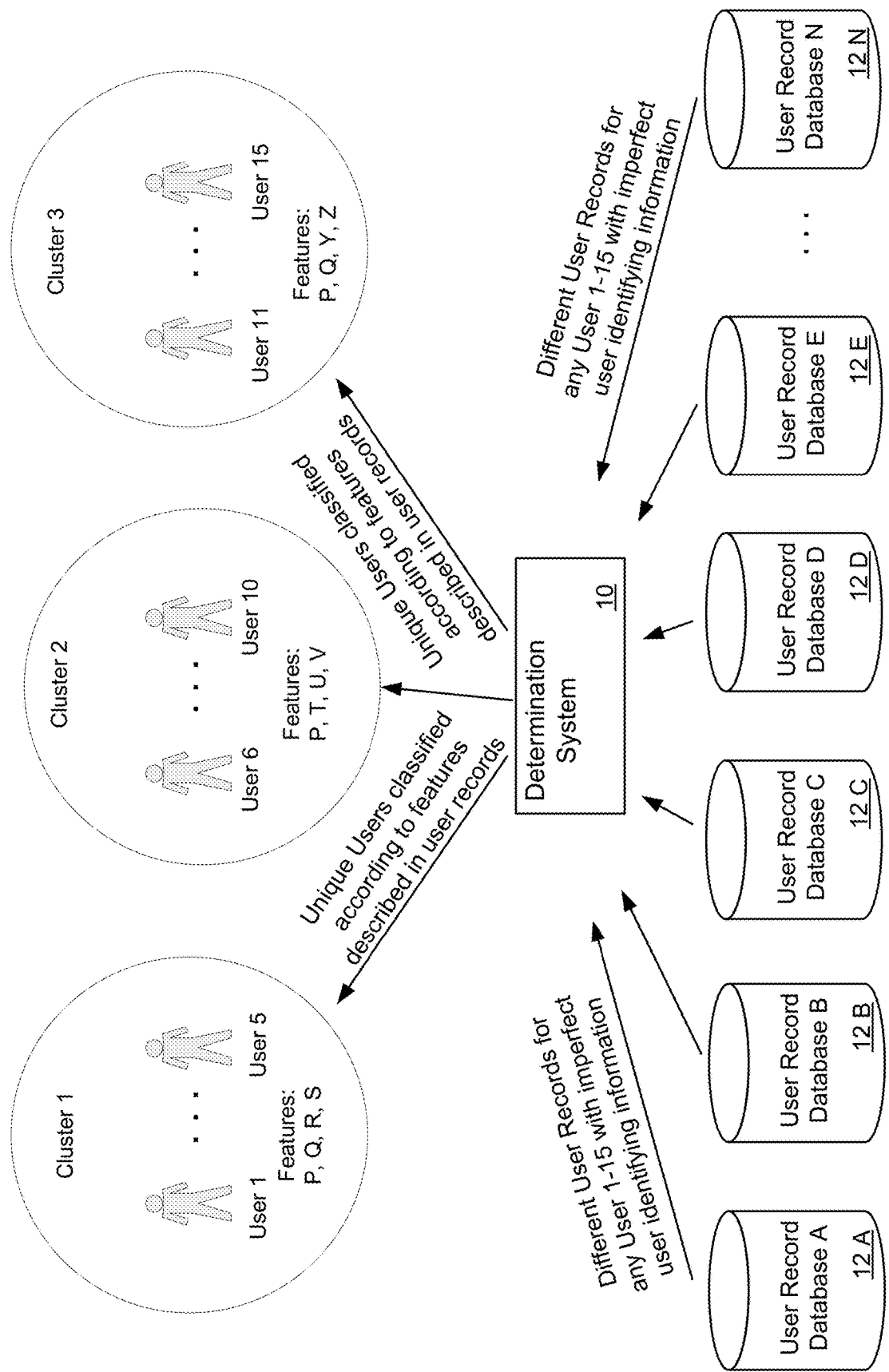
FIG. 1 illustrates an example of unique user determination and feature classification of users.

FIG. 1 is an example block diagram illustrating determining unique users from different user records and feature classification of the unique users. The example includes a multitude of databases (e.g., user record databases 12A-N) that may be spread across different geographic locations each storing user records associated with users (e.g., Users 1-15).

Each database can maintain user records as structured data (e.g., each user record is a row in a database table), or in some cases unstructured data (e.g., descriptive text associated with identifications of each user). Additionally, the stored user records can include imperfect identifying information of each user, that is, two user records associated with a same user can have a different identification for the user, incomplete or different information for a user, and/or the like. In an example, a different identification can include a different name of the user, a different address of the user, and so on. Therefore, without utilizing the techniques described in this specification, two user records with different identifying information would be determined to be associated with two different users, when in reality they should be associated with a same unique user. Thus, as will be described below, an identification of unique users can be determined.

Since the user records are spread across (e.g., stored by) any, or all, of the user record databases 12A-N, determining an entirety of the user records that are associated with each unique user presents a non-trivial technological challenge. Additionally, as described above, each user record can include different identifying information for an associated user.

A determination system 10 (e.g., a system of one or more computers), can obtain each user record from the user record databases 12A-N, and determine (e.g., using machine learning models as described below) that user records with different identifying information are associated with a same unique user. As an example, a first user record can identify a user's name as "Jose Smith", and a second user record can identify the user's name as "Joes Smith". As another example, a first user record can identify a user's name as "John Smith" with address "1234 Road Petrolia Calif.", and a second user record can identify the user's name as "John Smith" with address "4567 Lane San Francisco Calif.". The determination system 10 can determine, in both examples, (e.g., using machine learning models trained on user record information) that the two user records are associated with the same unique user (e.g., the user might have moved).

The determination system 10 can then process each user record associated with a same user to associate the information included in each user record with the user. The determination system 10 can perform complex merge, join, and so on, operations on the different user records to generate a cohesive view of the user. That is, the determination system 10 can take large amounts of structured and unstructured user records spread across vast distances and databases, and generate a full picture of each unique user.

After determining user records associated with each unique user, the determination system 10 can analyze (e.g., parse) each user record to determine features associated with the user. Features can include any explanatory variable, and be categorical, integer-valued, real-valued, and so on. In the example of FIG. 1, features include features P-Z, and are included, or determined from, user records associated with each user (e.g., Users 1-15).

The determination system 10 can perform a clustering process on the features to classify users according to the features (e.g., features P-Z) into one or more clusters (e.g., Clusters 1-3 as illustrated in FIG. 1). In some implementations, as will be described below, the determination system 10 can perform a k-means clustering process to partition the features into a particular number of clusters, in which each feature belongs to the cluster with the nearest mean (e.g., measure of central tendency).

The users (e.g., Users 1-15) are thus classified according to features described in all associated user records. As will be described below, the determination system 10 can obtain information identifying items connected, or otherwise associated, with each user. Through an analysis of the items connected, or otherwise associated, with each user in a particular cluster, the determination system can determine one or more items that an outlier user in a cluster is likely to be connected (e.g., in a future time period), or associated, with. An outlier user is a user that is not connected, or associated, with an item that greater than a threshold percentage (e.g., 80%, 85%, 90%) of remaining users in the cluster are connected, or associated, with.

The determination system 10 can thus correlate large numbers of user records, and gain insights into groups (e.g., clusters) of users. A reviewing user in communication with the determination system 10 (e.g., through use of a user device), can receive information (e.g., user interactive user interfaces) describing the users, clusters, user records, and items. In this way, the reviewing user can view summary data of electronic information that previously was impenetrable, and spread around large numbers of differently located and accessible databases. Additionally, for each unique user, the reviewing user can receive user interface data identifying each user record, and from which database the user record was located. In this way, the reviewing user can view a number of different users that would have been determined from the user records, had the determination system 10 not determined they are all the same unique user.

This specification describes a system (e.g., the determination system 10, the user determination system 100 described below) that can access user records (e.g., records that include information associated with users of a business) spread across different geographic regions and databases, and provide an overview of each user (e.g., each customer of the business) for display to a reviewing user (e.g., a sales analyst). The overview can include specific services, or items, that each user is connected with (e.g., subscribes to, or has paid for), particular services that each user is likely to disconnect from (e.g., cancel), and particular services that the user is amenable to connecting with in a future time period (e.g., selectable time period such as 3 months, 6 months).

In this specification, a service can include anything provided to a user that, in some implementations is associated with a transfer of consideration by the user (e.g., a recurring payment by the user), including an equitable transfer of the risk of a loss from the user to the business (e.g., insurance), a subscription to a product (e.g., a software product, a cleaning service), a good or product, and so on. A user record can include any information maintained by, or accessible to, the business that is associated with a user. For instance, a user record can include an e-mail provided to the business by a user, a description of an encounter with the user by an employee, documents or electronic information identifying services connected with the user, personal information including a name of the user, an address of the user, familial relationships of the user, and so on.

Since user records can, in many cases, be entered by employees of a business (e.g., employees can manually enter information such as name and address of a user), user records for the same user can include different information. For instance, the business can provide car insurance, and the employees associated with offering car insurance can maintain user records. The business can also provide life insurance, and the employees associated with offering life insurance can maintain user records. The user records between these two groups of employees can be in a different format, or simply include errors (e.g., a name of the user might be altered between two user records such as due to an error in entry, or the name might have multiple spellings and the employee can enter an incorrect spelling). Additionally, an address might be altered between two user records (e.g., the user might have moved in the interim period between two user records). Furthermore, a user record might include limited information, such as a name of a user and a connected service, but not a full recitation of an address, which can create an ambiguity of whether user records are associated with a same user.

The system can parse each user record, and determine all user records associated with a user. In this way, the system can determine a present state of a user using different user records spread across different geographic locations. The system therefore can associate each user with identifications of all services connected with the user.

After determining user records associated with respective users, the system can determine user churn information for each user, which in this specification includes likelihoods that the user will disconnect from one or more services in an upcoming period of time (e.g., a user selectable period of time). As will be described below, with reference to FIG. 3, the system can generate, or access, machine learning models that provides scores, or percentile rankings, for user churn information.

The system can also determine respective recommendations of services that have the highest probability of the user connecting with the service. As will be described below, with reference to FIGS. 3-4, the system can cluster users together according to features associated with each user (e.g., age, socio-economic information, gender, life events including recent purchase of a home or car, and so on), and determine whether any users in a cluster are not connected with services that a threshold percentage (e.g., a majority) of other users in the cluster are connected with.

The system can generate interactive user interfaces for presentation on a user device (e.g., interactive web pages), that describes users and associated information, such as user churn information, recommendations, and so on. A reviewing user (e.g., a sales associates, a sales analyst, sales operations employee, and so on), can access the user interfaces (e.g., in a browser executing on the user device) and quickly ascertain a full view of each user.

Figure 6:
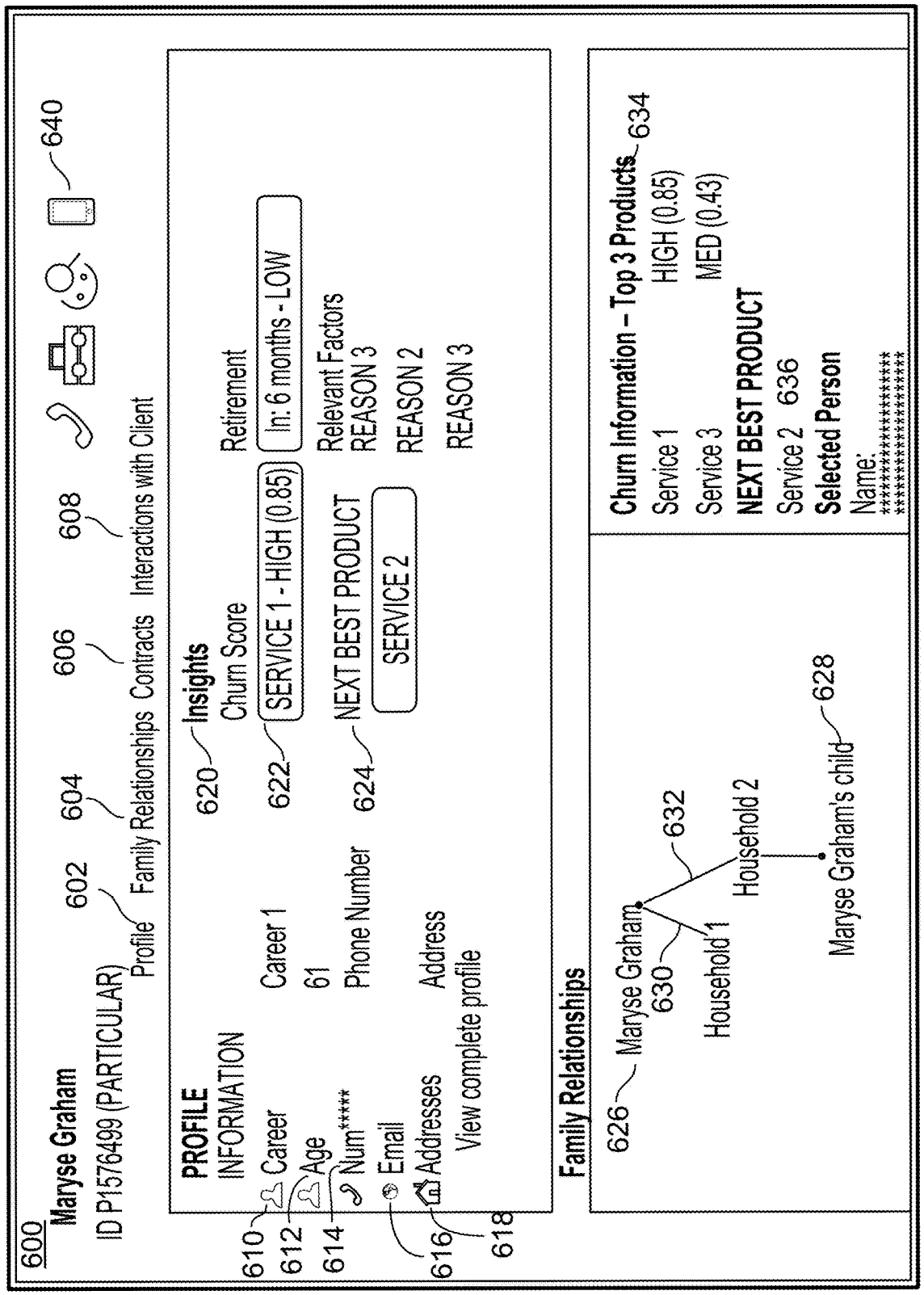
FIG. 6 is an example user interface of summary data describing the selected user.

As an example, described further in FIG. 6, the reviewing user can provide a request for summary information associated with a particular user. The system can generate a user interface that includes a name, age, phone number, email address, and address of the user. Additionally, the user interface can include a graph indicating familial relationships of the user, and associated services connected with the familial relationships (e.g., services the user has purchased for the relationships, or services the familial relationships have purchased).

The system can include churn information for each service the particular user is connected with, and visual indicators of a likelihood the user will disconnect from each service (e.g., red for high likelihood, yellow for medium, green for little). The system can further include a recommendation of a service to offer the user, a closest location of an employee that can discuss the recommendation with the user, and a method of contacting the particular user which has been historically shown to be the best (e.g., the user prefers to communicate with the business via email, in person, or over telephone).

In this way, merely by requesting information associated with the particular user, the reviewing user can obtain an overview of the user, and take actions including contacting an employee regarding the recommendation, or contact an employee to offer the particular user discounts, or reduced rates, on services the particular user is likely to cancel.

Figure 2:
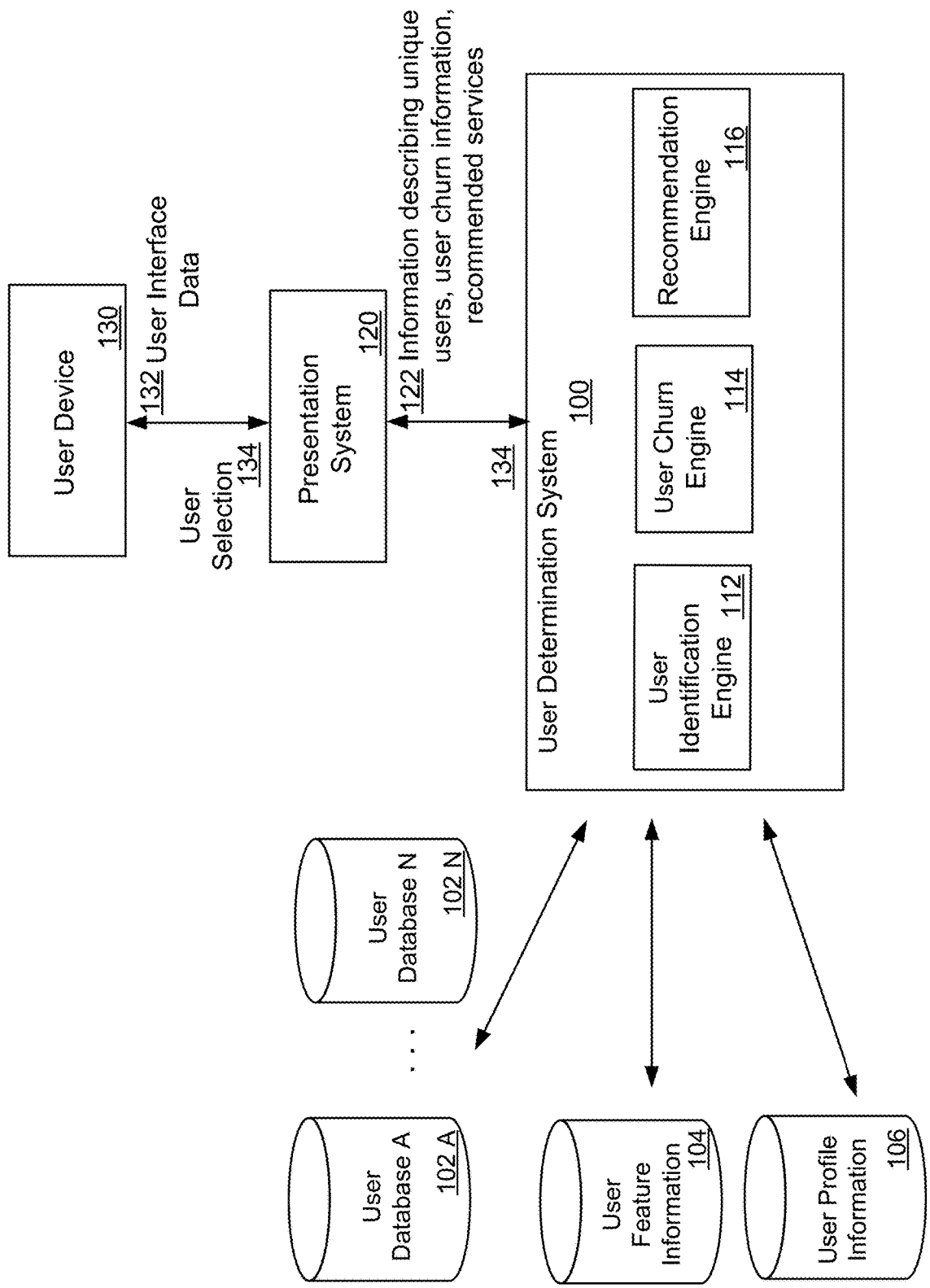
FIG. 2 illustrates a block diagram of an example user determination system.

FIG. 2 illustrates a block diagram of an example user determination system 100. The user determination system 100 (e.g., a system of one or more computers, or one or more virtual machines executing on a system of one or more computers) can obtain user records stored by different databases (e.g., user databases A-N 102A-N), and generate, or provide information to a presentation system 120 to generate, user interface data 132 describing users upon receipt of requests from a user device 130.

The user determination system 100 includes a user identification engine 112 that can obtain user records stored by different user databases 102A-N in different geographic areas. Each user record can include structured data associated with users (e.g., data stored in tables, with a row of a table being associated with a particular user) or unstructured data (e.g., descriptive text or other data associated with a particular user). The user identification engine 112 can identify (e.g., locate) all user records associated with users, and determine an identification of unique users. To effect the determination, the system can modify information included each user record (e.g., removing white space or punctuation from user records), and provide the modified information to one or more machine learning models to determine whether two or more user records are associated with a same user.

For instance, a first user record can include an identification of a name of a user (e.g., "Jose Smith"), and a second user record can include a different identification (e.g., "Joes Smith"). The machining learning models can determine that the name includes a same number of characters, and along with additional information (e.g., location, phone number, and so on) included in the user records, the machine learning models can label the records as the same user, or in some implementations determine a likelihood the records are associated with the same user. Determining unique users is described below, with reference to FIG. 3.

After determining unique users, the user identification engine 112 can store information associating each unique user with associated user record. For instance, as will be described below, the user feature information database 104 stores specific services connected with users, features associated with users, including age, demographics, location, and specific features related to services, including missed payments, and so on. The user profile information database 106 stores profile information, including a name of each user, an address, familial relationships, and so on. In some implementations the user feature information database 104 and user profile information database 106 can be the same database, and each unique user can be associated with respective features and profile information.

The user determination system 100 includes a user churn engine 114, which can access stored information (e.g., described above) describing services each user is connected with. The user churn engine 114 can determine a likelihood (e.g., assign a score) that each user will disconnect from respective services in a period of time (e.g., the next 3 months, 6 months, and so on).

To effect this determination, the user churn engine 114 can provide information describing each user to a machine learning model trained on historical data of users (e.g., users that have canceled services) and associated features of the users. The user feature information database 104, which in some implementations the user determination system 100 maintains, can store demographic information, age, gender, profession, identifications of life events (e.g., recently had children, recently bought a car), interactions with a business that provides the services (e.g., visitations to the business in a previous period of time, negative feedback provided by a user to the business), historical payment information (e.g., missed payments), comprehensiveness or complexity of contract associated with services, values associated with services (e.g., value of user's car with respect to car insurance service), number of uses of services (e.g., number of insurance claims). For the example feature of negative feedback, the user churn engine 114 can analyze emails provided by a user to the business, (or analyze descriptive text written by employees that describe interactions with the user), for negative language correlated with disconnecting from a service (e.g., a negative word can be "risk"). Determining user churn information is described below, with reference to FIG. 3.

The user determination system 100 further includes a recommendation engine 116 that can determine recommended services for each user. To effect the determination, the recommendation engine 116 can perform a clustering machine learning process on features describing each user, and classify the users in clusters according to the features. For instance, features can include an age of a user, a type of domicile of the user (e.g., apartment, house), a type of geographic area the domicile is located (e.g., a suburb, a rural area, a city), a salary of the user, method of communicating with a business (e.g., email, phone, in person), and so on.

After clustering each user into a respective cluster associated with particular features, the recommendation engine 116 can obtain identifications of services each user is connected with (e.g., determined by the user identification engine 112). The recommendation engine 116 can determine recommended services for each user based on a percentage of remaining users in a same cluster that are connected with services not yet connected with the user.

Additionally, the recommendation engine 116 can modify the recommended services for a user based off unique information associated with the user. For instance, if a particular user does not own a car, but a particular threshold (e.g., a majority) of the remaining users in the cluster have car insurance, the particular user will likely not be interested in car insurance. The recommendation engine 116 can then determine that car insurance is not a recommended service for the particular user. Determining recommend services is described below, with reference to FIGS. 3-4.

The user determination system 100 can provide information describing each unique user, user churn information, and recommended services, to a presentation system 120. The presentation system 120 can be a system of one or more computers, or in some implementations can execute on the user determination system 100. The presentation system 120 is in communication with a user device 130 of a reviewing user, and is configured to provide user interfaces 132 for presentation on the user device 140. The user interfaces 132 can be documents (e.g., web pages that include HTML, XML, and so on), which the user device 130 can receive and provide for presentation (e.g., render in a web browser).

The reviewing user can view the user interfaces 132 (e.g., the example user interfaces described in FIGS. 5-8), and interact with the user interfaces 132 to provide user selections 134 and receive different, or more detailed information, about the user selection 134. For instance, the reviewing user can provide a user selection 134 of a particular user, and receive detailed information associated with the particular user including an identification of a cluster the selected user was determined to be included in (e.g., along with associated features of the cluster), specific services connected with the selected user, information describing familial relationships, and so on. Examples of user interfaces are described below, with reference to FIGS. 5-8.

Figure 3:
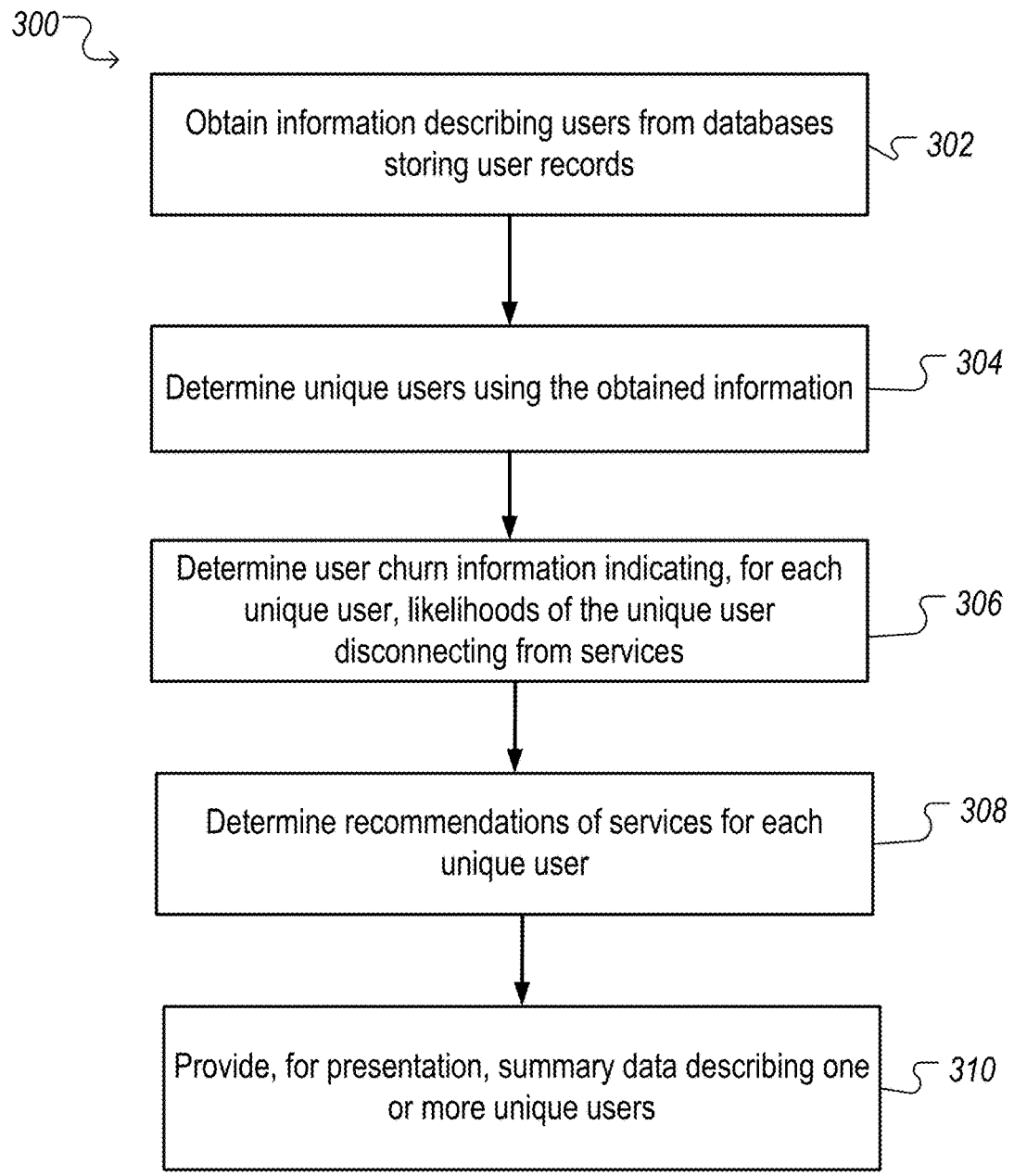
FIG. 3 is a flowchart of an example process for providing summary data describing users.

FIG. 3 is a flowchart of an example process 300 for providing summary data describing unique users. For convenience, the process 300 will be described as being performed by a system of one or more computers (e.g., the user determination system 100).

The system obtains information describing users from databases storing user records (block 302). As described above, with reference to FIG. 2, the system can obtain user records describing a multitude of users from different databases located in different geographic areas.

The user records can include information describing respective users, and can include a name of the user, an address of the user, specific services connected with the user, payment history of the user (e.g., associated with a respective service), emails or other text provided by the user, descriptive text from an employee describing an interaction with the user, and so on.

The system determines unique users using the obtain information (block 304). Each user record can include different (e.g., imperfect, incomplete, and/or the like) information identifying a user associated with the user record.

The system determines unique users from the entirety of the obtained user records, where a unique user can include user records associated with differently identified users that are determined to be directed to the same unique user.

To effect this determination, the system can apply one or more processes to identifying information included in each user record. That is, the system determines whether user records are related.

For instance, the system can apply a cleaner process to the identifying information. The cleaner process can apply one or more cleaning functions to each user record, such as making alphanumeric characters in each identifying field (e.g., included in a user record as a column intersecting a row) lowercase, removing punctuation from each identifying field, removing all numbers in a field, removing everything but the numbers in the field, or modifying "St" to "Street". As an example, an identifying field can include a phone number (e.g., "(123) 456-7890"), and the cleaning function can be applied to the field resulting in a modified field (e.g., 1234567890). In this way, when the system compares identifying fields that includes phone numbers, the system can compare only numbers and not the white spaces or parentheses.

Next, the system can apply one or more blocking processes, which reduce the number of comparisons necessary to determine if two user records are related to a same user. An example blocking process can assign user records to different groups of user records based on identifying information included in each user record. For example, an assignment can be based on phone number, and if the system determines that two user records include the same phone number, the system can assign each user record to the same group associated with the specific phone number. Similarly, if the system determines that two user records include a same particular address and phone number, the system can assign each user record to the same group (e.g. a group partially defined by user records with the particular address and phone number combination).

The system can then perform a pair generation process, which can include performing a product (e.g., a Cartesian product) of two or more groups. The product can pair respective types of identifying information from each user record together (e.g., phone number information, address information, name information). The system can then perform a feature evaluation process to evaluate each generated pair. For instance, a first user record can include a name "Trader Joes", and a second user record can include a name "Trader Jose", the system can evaluate these user records to determine that the difference in length between these names is zero. As another example, a first user record can not include a name, but have a particular phone number and address included, and a second user record can include a name, and the same particular phone number and address. The system can evaluate these user records to determine that the two user records likely indicate the same user. Other evaluation processes and types can be utilized.

The evaluated pairs are provided to one or more machine learning models (e.g., models trained on labeled information), with the machine learning models including supervised and unsupervised models. The evaluated pairs are then assigned a score (e.g., a normalized score between 0-1) indicating a likelihood that the user records are related. The system can associate user records that are related at greater than a threshold score (e.g., 0.75, 0.8, 0.9). Furthermore, in some implementations, the system can provide information identifying user records that are less than the threshold, and a reviewing user can determine whether the user records are related.

For further description of determining unique users, see, for instance, U.S. patent application Ser. No. 15/233,149 titled "SYSTEMS AND METHODS FOR AUTOMATIC CLUSTERING AND CANONICAL DESIGNATION OF RELATED DATA IN VARIOUS DATA STRUCTURES," which is incorporated by reference herein in its entirety and for all purposes.

The system determines user churn information for each unique user (block 306). As described above, user churn information includes likelihoods that each user will disconnect from respective services in a period of time (e.g., the next 3 months, 6 months, and so on).

The system obtains information identifying all services each unique user is connected with, and determines a likelihood (e.g., a score, a percentile ranking compared to other users that are connected with the service), that the unique user will disconnect from the service.

To determine a likelihood for a particular service connected with a user, the system provides features associated with the user to one or more machine learning models. The features can include demographic information, age, gender, profession, identifications of life events (e.g., recently had children, recently bought a car), interactions with a business that provides the service (e.g., visitations to the business in a previous period of time, negative feedback provided by a user to the business), historical payment information (e.g., missed payments), comprehensiveness or complexity of contract associated with the service, a value associated with the service (e.g., value of user's car with respect to car insurance service), number of uses of the service (e.g., number of insurance claims), information identifying whether the user disconnected from other services, or related services.

For the example feature of negative feedback, the system can analyze emails provided by the user to the business, (or analyze descriptive text written by employees that describe interactions with the user), for negative language correlated with disconnecting from a service. Determining features is described below, with reference to step 402 of FIG. 4.

The machine learning models can be trained on historical information identifying features of users that disconnected from services, and can be updated according to historical data collected periodically (e.g., every week, every month, and so on).

The likelihood of a particular user disconnecting from a particular service can be relative to other users that are connected with the particular service. For instance, the likelihood can be a percentile risk identifying how likely the particular user is to disconnect from the service as compared to how likely other users are to disconnect from the service. In some implementations, the system can designate particular percentiles as different labels (e.g., High, Medium, Low).

As will be described below, the system can generate user interfaces for presentation on a user device of a reviewing user. The reviewing user can select a user to receive information regarding, and the system can determine user churn information for the selected user. When generating user interfaces describing the selected user, the system can include identifications of the percentile risk of disconnecting from connected services, which in some implementations can be a color associated with a label (e.g., green for low risk, yellow for medium risk, red for high risk). Additionally, in some implementations the system can solely present identifications of services with associated likelihoods of the selected user disconnecting from the service at greater than a threshold (e.g., greater than a threshold percentile such as 60%, 75%).

For a further description of determining user churn information, see, for instance, U.S. patent application Ser. No. 14/562,524 entitled "SYSTEM AND METHOD FOR DETERMINING A PROPENSITY OF ENTITY TO TAKE A SPECIFIED ACTION," filed on Dec. 5, 2014, which is hereby incorporated by reference herein in its entirety and for all purposes.

The system determines recommendations of services for each unique user (block 308). As described in FIGS. 1-2, the system clusters unique users together according to features determined from, or included in, user records associated with each unique user. Recommended services for each unique user can include the services for which the unique user is an outlier with respect to services connected with the remaining unique users in a cluster. Determining outlier users is described below, and further in FIG. 4.

Features utilized for clustering can include age, a type of domicile (e.g., apartment, house), a type of geographic area a domicile is located (e.g., a suburb, a rural area, a city), specific geographic area (e.g., particular city, neighborhood in city), salary, gender, connected services, familial relationships (e.g., a user has kids), married or single, owns a car, leases a car, credit score, method of communicating with a business that provides the services (e.g., email, phone, in person), and so on.

The system clusters the users according to respective values of each feature using a clustering process (e.g., a p-clustering process, a k-means clustering process, and so on). After clustering, the system obtains information identifying services connected with each user in a cluster. For a particular user included in a cluster, the system identifies services connected with the remaining users in the cluster, which the particular user is not presently connected with. The system can rank the identified services according to a percentage of the remaining users that are connected with each identified service. Additionally, the system can modify the ranking with information unique to the particular user (e.g., as described above, if the particular user does not have a car, the system will not recommend car insurance). Determining recommended services is described below in more detail, with reference to FIG. 4.

The system provides summary data describing one or more unique users for presentation (block 310). The system generates user interface data describing one or more unique users, which can include summary data of services each unique user is connected with, user churn information for the services, recommended services, familial relationships, and so on.

The system can receive a request from a user device of a receiving user for particular information, and the system can generate user interface data that includes the requested information in easy to view, and digest, forms.

For instance, the reviewing user can input a selection of a user (e.g., a name of a user), and the system can provide user interface data describing the selected user (e.g., illustrated in FIG. 6).

Additionally, the reviewing user can request information describing clusters that include users (e.g., hundreds, thousands, tens of thousands, hundreds of thousands, of users in each cluster). For instance, the system can receive a request to receive information associated with a selected cluster. The system can generate user interface data that includes summary data of users included in the selected cluster, including an average (e.g., measure of central tendency) age of the users, percentage of users associated with a gender, percentile information of the users compared to users not included in the selected cluster (e.g., percentile ranking of average household income). Additionally, the summary data can include most common services connected with users in the selected cluster, and top recommended services for the cluster (e.g., services that are recommended for the greatest amount of users in the cluster). An example user interface is described below, with reference to FIG. 8.

Furthermore, the reviewing user can request summary data of recommended services for users, and the system can generate user interface data that can include top recommended services for all users. The reviewing user can interact with the user interface to specify a particular geographic area he/she is interested in, and the system can provide the top recommended services for users located in the particular geographic area. The reviewing user can further filter the presented users by selecting additional information (e.g., users with greater than a threshold salary, users greater than a particular age, users that are married or have children, and so on). Additionally, the reviewing user can request to receive identifications of users that are strong outliers of their respective clusters (e.g., users that lack connection to a service in which greater than a large percentage, 85%, 90%, or a percentage selectable by the reviewing user, of remaining users are connected with). In this way, the reviewing user can identify users to contact regarding connecting with particular services.

The reviewing user can utilize the generated user interfaces to quickly determine information associated with each user, services to recommend to each user, likelihoods of each user disconnecting from services, and so on.

Specific examples of the reviewing user utilizing the user interfaces generated by the system are described below with respect to FIGS. 5-8.

Figure 4:
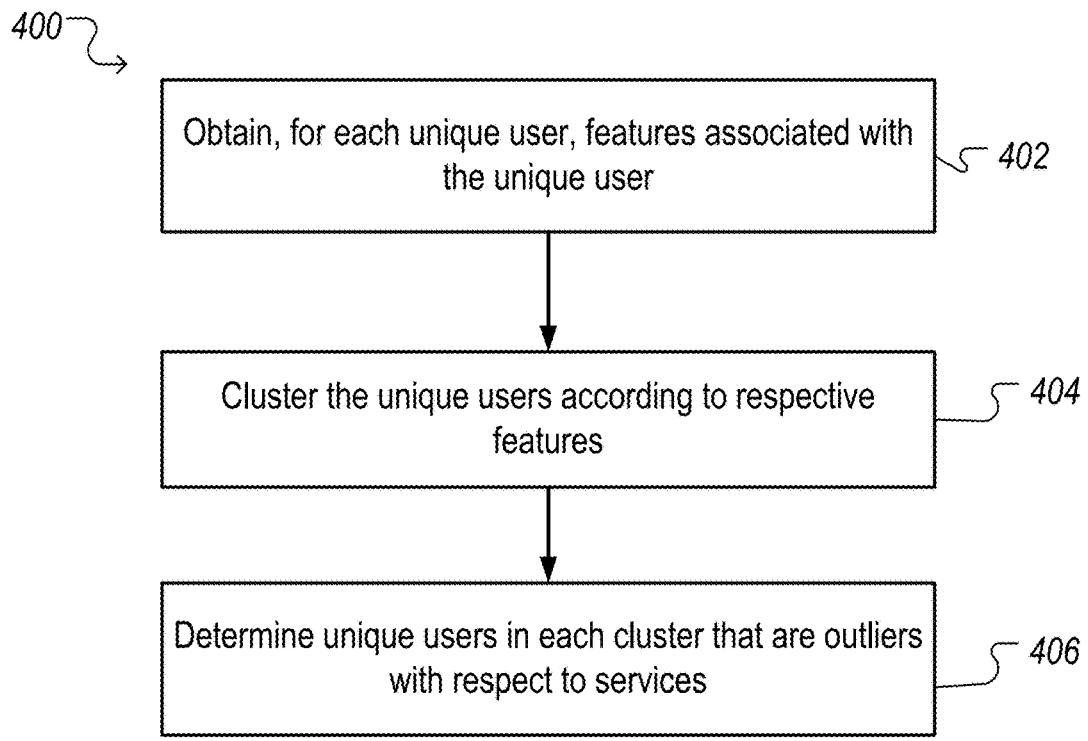
FIG. 4 is a flowchart of an example process for determining outlier users based on feature classification.

FIG. 4 is a flowchart of an example process 400 for determining outlier users based on feature classification. For convenience, the process 400 will be described as being performed by a system of one or more computers (e.g., the user determination system 100).

As described above, with reference to FIG. 3, the system determines recommended services for users. To determine recommended services, the system clusters users into clusters classified according to features associated with each user, and determines services to recommend based on services connected with users included in a same cluster.

The system obtains features with each unique user (block 402). The system determines unique users from users identified in user records spread across databases (e.g., databases 102A-N). As described in FIGS. 2-3, each user record can include imperfect (e.g., different, incomplete, and/or the like) identifying information (e.g., imperfect spellings of a name of a same user, different addresses of a same user, and so on). The system determines unique users using different user records to determine all user records associated with each unique user.

User records can include recitations, or information describing, features of an associated user. As described in FIG. 2, user records can include structured data (e.g., data organized into tables, with each row including an identification of a user and associated feature information), or unstructured data (e.g., descriptive text or other information associated with a user).

The system determines features for each unique user from the user records, and can in some implementations, determine schemas for databases that store user records, and extract features (e.g., user selectable features) from the databases using the determined schemas. Additionally, the system can perform pattern matching on structured data included in each user record, and recognize word or phrases associated with particular features of interest (e.g., user selectable features). For instance, if a feature is an age of a user, the system can identify phrases corresponding to "age", "year", or functional equivalents, and associate the age feature as corresponding to values stored in the associated row. Similarly, the system can perform natural language processing (e.g., natural language understanding) on descriptive text included in structured or unstructured data (e.g., descriptive text can be included in scanned documents associated with a user such as a contract, or can be text written by an employee describing an interaction with a user, or can be descriptive text written by a user such as an e-mail), and extract (e.g., parse) features from the descriptive text.

The system determines features from the entirety of the user records, which in some implementations can include conflicting values for each feature. For instance, a particular user record might identify a user's age as "43", and another user record might identify a user's age as "45". In some implementations, the system can set an age of the user as the average between the obtained ages, or in some other implementations, the system can access one or more outside databases that include descriptive information of users (e.g., social networks, public government database), and determine an age of the user.

A feature described above, with reference to FIGS. 2-3, includes familial relationships of a user. As with other features, the system determines familial relationships from the user records. For instance, if a user record identifies familial relationships (e.g., a user record can store structured data with a row of the structured data identifying family members), the system can obtain the familial relationships. The system can then determine whether user records exist for the familial relationships, and associate information between each user included in a same familial relationship.

Additionally, the system can determine familial relationships based off names of users, addresses of users, ages of users, payment information (e.g., payment for a particular user can be from a different user), and other information. For instance, the system can determine that a user named "Frank Zwyper" is likely associated with a user named "Laura Zwyper" (e.g., based off a determination of a frequency of occurrence of last names), and increase the likelihood if the two users live in the same geographic region, and further increase the likelihood if the two users live at the same address. Furthermore, the system can determine whether "Frank" and "Laura" are included in a same familial relationship based off descriptive text included in user records. For instance, descriptive text can include an employee describing an interaction with a user and his/her wife/husband, and the system can identify a user corresponding to a same name of the wife/husband and assign a likelihood of the familial relationship (e.g., based on other features including address, and so on).

The system clusters the unique users according to respective features (block 404). The system utilizes one or more machine learning models to cluster unique users into clusters classified based on features (e.g., values associated with features) of the unique users. The system can utilize a k-means clustering, p-clustering, or other clustering process, to assign each user to a particular cluster.

The system determines unique users in each cluster that are outliers with respect to connected services (block 406). The system determines recommended services, as described above in FIG. 3, for users based on services connected with users in a same cluster.

For each cluster, the system obtains identifications of services each user included in the cluster is connected with, and determines an ordering of the most popular services connected with users in the cluster. The system then identifies the services that each user in the cluster is not connected with, that is the system determines outlier users with respect to services.

The system determines recommended services for each user by identifying the most popular services in his/her cluster, that the user is not connected with. The system can then assign a likelihood of each user connecting with the recommended services, with the likelihood based off a popularity of the service in the user's cluster. That is, the system can assign a likelihood in conformance with the popularity of each service in the user's cluster.

In some implementations, the system can utilize unique information to the user to update, or determine, the likelihood. For instance, if a recommended service for a user is life insurance, and a user record for the user includes descriptive text, or structured data which identifies, that life insurance was offered to the user in the past, and the user turned the offer down because the user has free life insurance through his/her employer, the system can decrease the likelihood of the user connecting with life insurance. Additionally, if a recommended service for a user is health insurance, and a user record for the user includes descriptive text (e.g., written by an employee interacting with the user), or structured data which identifies, that the user recently switched to an employer that offers bad health insurance, the system can increase a likelihood of the user connecting with health insurance.

In this way, the system can determine that if users in a particular cluster (e.g., users with two kids that are relatively affluent) generally are connected with life insurance, a particular user in the cluster that is not connected with life insurance is likely to connect with life insurance if offered.

User Interfaces

User interfaces described in FIGS. 5-8 are examples of interactive user interfaces generated by a system (e.g., the user determination system 100), or a presentation system in communication with the system, and presented on a user device. In some implementations, the user interfaces can be presented on the user device as a document (e.g., a web page) in an application (e.g., a web browser). In some implementations, a user device can receive user input on a user interface, and a different user device, or user interface, can present data.

Each of the user interfaces described below includes user selectable options, which upon selection, can cause the system to obtain associated information (e.g., from databases 102 A-N, 104, 108), determine updated information, and modify, or generate, user interface data. The user interfaces can provide reviewing users insights into users that are likely to disconnect from, or connect with, services.

Additionally, alerts can be generated and information associated with the alerts can be provided in the user interfaces, or via e-mail, text (e.g., MMS, SMS), phone calls, or through activation of an application executing on a user device that is associated with the system. For instance, alerts can be generated based on monitoring information associated with one or more users (e.g., specific users), including particular services they have disconnected from, or are predicted to disconnect from (e.g., as described above). Additionally, alerts can be generated based on ranking information of the users disconnecting from one or more services (e.g., if a medium ranking is assigned to a service, and then the ranking changes to a high, an alert can be generated). Similarly, alerts can be generated upon monitored information associated with a threshold number of users (e.g., a threshold number of users are predicted to disconnect from a particular service, a threshold number of users are to be recommended a particular service, and so on). In this way, the system can ensure that time-sensitive information associated with users timely reaches an intended user (e.g., by activating an associated user device).

FIG. 5 is an example user interface 500 for selecting a user to receive associated summary data. The user interface 500 includes a selectable area 502 in which a reviewing user can enter a name of a user about which to receive information (e.g., summary data). The system can search stored information of users, and identify one or more unique users that correspond to the entered name. In some implementations the user interface 500 can include additional identifying information including an address, phone number, and so on, of each identified user.

As illustrated in FIG. 5, the user interface 500 includes a last name 504, a first name 506, an identification of a unique identifier associated with each unique user 508, and so on. The user interface 500 is configured to update as the reviewing user is entering a name (e.g., the user interface 500 can provide each entered character to the system as the reviewing user types it, and the system can provide updated identifications of users for presentation in the user interface 500).

FIG. 6 is an example user interface 600 of summary data describing the selected user. The user interface 600 includes selectable options to receive particular information about the selected user, for instance selectable option "Profile" 602 provides the reviewing user with user profile information, selectable option "Family Relationships" 604 provides the reviewing user with familial relationships of the selected user, selectable option "Contracts" 606 provides the reviewing user with services the selected user is connected with, selectable option "Interactions with Client" 608 provides the reviewing user with descriptive text of interactions with the selected user. Selectable options "Contracts" 606 and "Interactions with Client" 608 are described below, with reference to FIG. 7.

The user profile information (e.g., which can be transitioned to upon the reviewing user selecting selectable option "Profile" 602, or which can be displayed at the top of user interface 600), includes identifications of information describing the selected user. For instance, the user profile information includes identification 610 of an employer, or career, of the selected user, or whether the selected user is employed. Additionally, the user profile includes an age 612 of the selected user, a phone number 614 of the selected user, an email address 616 of the selected user, and an address 618 of the selected user. In some implementations, the system can display only particular types of user profile information which the system has stored. In some implementations, if the system lacks particular user profile information, it can include a blank designation next to the particular user profile information.

The user profile information further includes "Insights" 620 into the selected user, which are insights determined by the system. The user interface 600 includes identification 622 of a service the selected user is most likely to disconnect from (e.g., "Service 1"), which is further described above in FIG. 3 (e.g., user churn information). The identification 622 includes a label identifying a percentile ranking of the selected user disconnecting from the service (e.g., as compared to other users). The label can be colored (e.g., red) and as illustrated, states "High" with an associated high probability, or percentile ranking, of the user disconnecting from the service. The user interface 600 further includes identification 624 of a recommended service (e.g., based off clustering information described above in FIG. 4. In the example of FIG. 6, the system has determined that a recommended service is "Service 2."

The familial relationship is included in the "Family Relationships" 626 portion of the user interface 600 (e.g., which can be transitioned to upon the reviewing user selecting selectable option "Family Relationships" 604). The family relationship information includes identification of the selected user 626, connected by a line to a familial relationship 628, which can identify a name of the familial relationship and a nature of the familial relationship. The familial relationship 628 can be a selectable option, and if the familial relationship 628 is also a user included in the system, upon selection of the relationship 628, the system can provide a user interface describing summary data of the familial relationship (e.g., in a similar user interface as the user interface 600).

The family relationship information includes two lines connected with the selected user 626. The first line is connected from "Household 1," to the selected user 626. This first line 630 visually shows the reviewing user that the selected user is associated with the particular household. The first line 630 therefore illustrates that the particular household is identified in a particular user record of the selected user. The second line 632 is connected from the selected user 626 to a different "Household 2," and further connected with the familial relationship 628.

In this way, the reviewing user can identify that the selected user 626 changed households (e.g., changed addresses), and the system accessed different user records associated with the different households, but determined that the different user records are each associated with the unique selected user 626. The user records associated with the second line 632 include an identification of the familial relationship 628. Without the system determining unique users, the reviewing user would therefore not have knowledge that the two different households are each associated with the familial relationship 628, and the reviewing user might not have knowledge of all services connected with the selected user 626.

The user interface 600 includes additional summary data regarding churn information 634, and includes two services from which the selected user has been determined likely to disconnect. The user interface 600 includes identifications of the two services, and associated labels of the likelihood. The user interface 600 further includes identifications of recommended services 636, which in the example of FIG. 6 identifies a single service (e.g., "Service 2.") However, if a selected user has more than a single recommended service, the user interface can include identifications of each recommended service. Additionally, the user interface 600 can solely include identifications of recommended services that are associated with likelihoods greater than a threshold (e.g., 60%, 75%).

The user interface 600 further includes identifications 640 of methods of communication the selected user prefers, which can be determined from user records for the selected user. In the example of FIG. 6, the identifications 640 identify that the selected user has called on a phone, entered physical locations associated with the services for in-person conversations, accessed a website associated with the services, and utilized a phone application.

FIG. 7 is an example user interface 700 of detailed data associated with the selected user. In some implementations, the user interface 700 can be provided to the reviewing user upon the reviewing user interacting with the user interface 600 to scroll down (e.g., the user interface 700 is below the user interface 600). In some implementations, the user interface 700 can be presented upon the reviewing user selecting the "Contracts" 606 selectable option described in FIG. 6.

The user interface includes identifications of user churn information 702, including an identification of each service connected with the selected user, and associated labels 704 of likelihoods of the selected user disconnecting from the service. Additionally, an identification of an employee, or agent, 706 that initially connected the service to the selected user (e.g., sold the service), is identified. Each identified employee, or agent, 706 is configured to be selectable, and upon a selection by the reviewing user, the user interface 700 can provide contact information of the agent, or employee. In this way, the reviewing user can notify the particular employee, or agent, 706 that the selected user is likely to disconnect from the service. Additionally, as described above an alert can be automatically generated to the particular employee or agent.

The user churn information 702 further includes features that indicate reasons for the selected user to disconnect 708 from the selected service (e.g., Service 3), or remain connected 708 with the selected service (Service 3). The reviewing user can select a particular service include in the user churn information 702, and the reasons 708-710 can update to describe the selected service. As illustrated in FIG. 7, "Service 3" has been selected and identified as being selected (e.g., highlighted, bolded, and so on). For instance, in the example of FIG. 7, a reason the selected user is to disconnect from the service (e.g., Service 3) is that there is an "absence of coverage of collateral damages for auto insurance" 712. As described above in FIG. 3, the system can determine user churn information with features that include a complexity, or comprehensiveness, of a contract associated with each service. Similarly, the user interface 700 includes a reason the selected user is to remain connected with the service (e.g., the selected user has paid his/her bill consistently for four years 714). In this way, the reviewing user can quickly identify reasons determined (e.g., by machine learning models) that the selected user might disconnect from the service. The reviewing user can then contact the associated employee, or agent 706 to offer perks to the selected user (e.g., better damage coverage for auto insurance).

The user interface 700 includes information describing interactions with the selected user, known as "Interactions with Client" 720 in the user interface 700. The "Interactions with Client" 720 portion can be presented upon the reviewing user selecting the "Interactions with Client" 608 selectable option described in FIG. 6.

The "Interactions with Client" 720 portion includes identifications of interactions with the selected user (e.g., ordered by time), and information describing each interaction. For instance, a most recent interaction 722 includes a description of the interaction (e.g., an agent mailed information to the selected user). The interactions can also include, at least, conversations with the selected user and mode of conversation (email, phone, in-person). The information can further include descriptive text regarding the interaction (e.g., subject matter of discussion, and so on).

Additionally, the "Interactions with Client" 720 portion further includes an analysis 724 of descriptive text (e.g., "Significant Interactions") included in user records for the selected user. The descriptive text can be included in emails, or other text, provided to a business associated with services connected with the selected user. Additionally, the descriptive text can be entered by employees, or agents, associated with the selected services. The system can analyze the descriptive text for particular words correlated with positive or negative connotations (e.g., "risk"), and include portions of descriptive text associated with a positive or negative connotation.

In some implementations, the information included in the "Interactions with Client" 720 portion can be updated based on a user selection of a service connected with the selected user. That is, the "Interactions with Client" 720 portion can include interactions, and descriptive text analyses, related solely to the selected service. In some implementations, the "Interactions with Client" 720 portion can include interactions and descriptive text analyses related to each service connected with the selected user.

Figure 8:
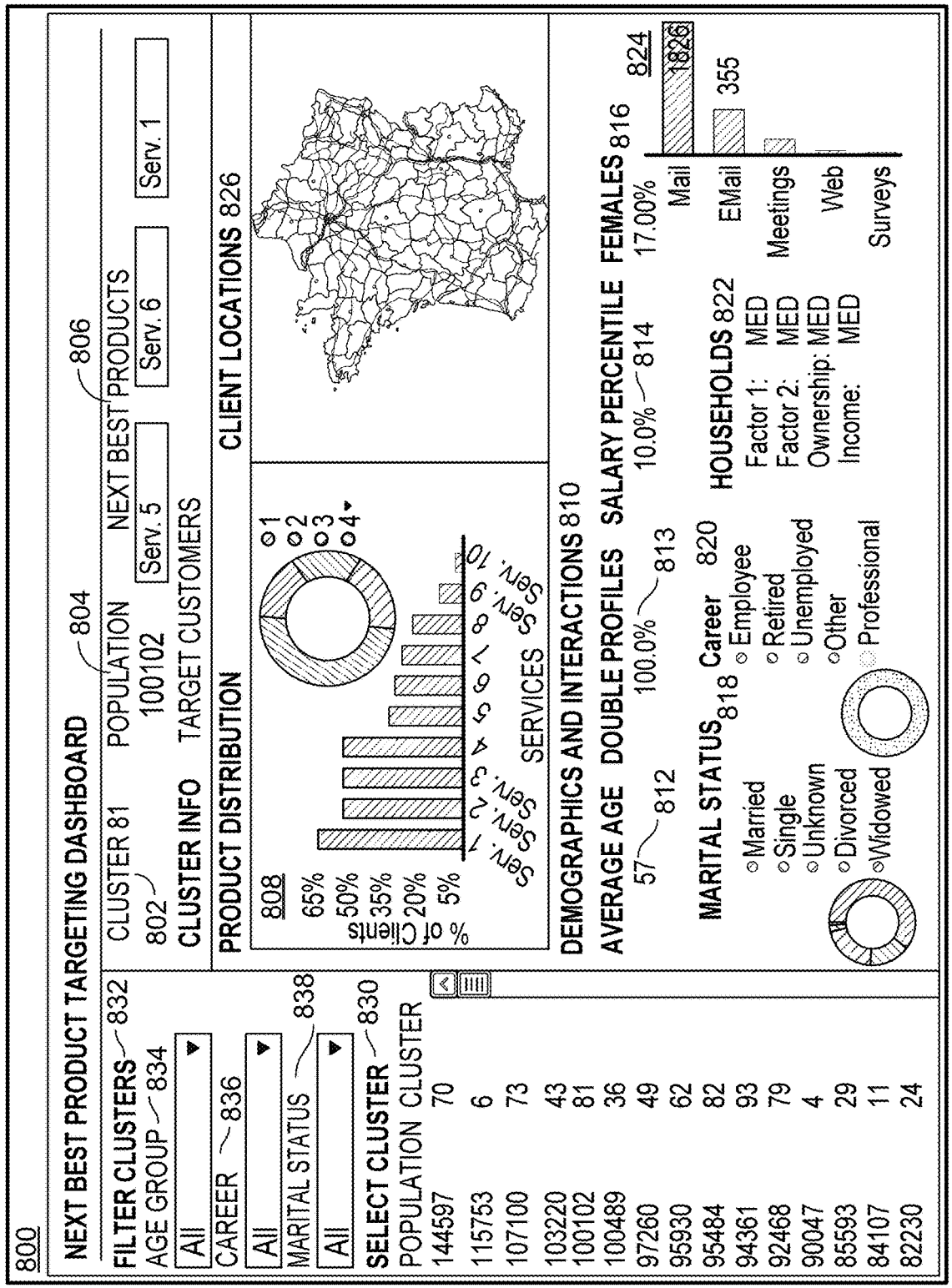
FIG. 8 is an example user interface describing a particular cluster that includes users classified by features.

FIG. 8 is an example user interface 800 describing a particular cluster that includes users classified by features. The user interface 800 includes information describing a cluster 802 selected by the reviewing user (e.g., "Cluster 81").

The user interface 800 includes summary data of the selected cluster 802, including an identification of a number of users 804 (e.g. "100102") included in the selected cluster 802. Additionally, the user interface 800 includes summary data of recommended services 804 for the selected cluster 802. The recommended services can be the services recommended for the largest numbers of users in the selected cluster 802 (e.g., the top 2, 3, 5, services).

The user interface 800 further includes summary data of services 808 connected with users in the selected cluster 802 (e.g., "Product Distribution"). In the example of FIG. 8, the summary data 808 is a bar graph, identifying a percentage of users in the selected cluster 802 that are connected with each service.

The user interface 800 includes summary data of users 810 included in the selected cluster 802. The summary data 810 can include an "Average Age" 812 (e.g., measure of central tendency of ages of users in the selected cluster 802), an identification of a percentile of an average salary 814 of the users in the selected cluster 802 compared to users in other clusters, and an identification of a breakdown of gender 816 of the users (e.g., gender self-identified by the users). Additionally, the summary data 810 can include an identification of a percentage of users 813 that are associated with user records with different identifying information.

The summary data of users 810 further includes graphical representations of particular types of summary data 810. For instance, the summary data 810 includes a graphical representation of "Marital Status" 818 (e.g., marriage, single, divorced, and so on). The summary data 810 further includes a graphical representation of Careers 820. The "Career" 820 graph identifies a breakdown of the career status the users in the selected cluster 82 have, which in the example of FIG. 8, is largely "Professional". Additionally, the summary data 810 includes a graphical representation of "Households" 822, which can describe the households associated with each user. For instance, "Households" 822 includes a designation of income level of the household, ownership level of households (e.g., a percentile ranking home ownership in the selected cluster 802 compared with home ownership in other clusters), and so on (e.g., Factors 1 and 2).

The summary data of users 810 includes user preferences of types of communication techniques 824. For instance, the user interface 800 identifies that users prefer to be contacted by "Mail" firstly, and "Email" secondly. The preferences can be based off user records, and specifically the system can determine that users in the selected cluster 802 respond to communications sent via mail instead of e-mail, and/or determine that users have connected with services in a period of time (e.g., a month) after receiving mail.

The user interface 800 includes a graphical representation of a geographic area 826 (e.g., France"), in which the users are located. The reviewing user can select a portion of the geographic area 826, and the system can provide an updated user interface that identifies recommended services 806 and summary data 808, 810, of users located in the selected portion.

As illustrated, the graphical representation can indicate concentrations of users in particular areas of the geographic area 826. In this way, the reviewing user can identify locations of large concentrations of users in the selected cluster 802. Furthermore, the reviewing user can select a particular recommended service 806, and the graphical representation of the geographic area 826 can be updated to indicate concentrations of user that are amenable to connecting with the selected recommended service.

Similarly, the reviewing user can select a particular portion of the graphical representation of the geographic area 826 (e.g., a particular city), and the user interface 800 can be updated to include identifications of employees, or agents, that are located in the particular portion, and in some implementations, that are known (e.g., historically) to interact with users also located in the portion.

Thus, the reviewing user can select a particular recommended service, view large concentrations of users that are amenable to connecting with the particular service, and identify employees, or agents, that are known to interact with the users. The reviewing user can contact the employees, or agents, and notify them of users they interact with, or are located near, that are amenable to connecting with particular services.

To enable the reviewing user to select a cluster, the user interface 800 includes identifications 830 of each cluster, and filters 832 to limit the number of clusters presented in the user interface 800.

The filters can include a specific "Age Group" 834, a specific "Career" 836 (e.g., specific type of career"), a specific "Marital Status" 838, and so on. The reviewing user can also enter a particular user's name, and receive the cluster in which the particular user is included. In addition to the filters 832 included in user interface 800, the filters can include any feature included in user records.

Additionally, the reviewing user can identify a service he/she is interested in, and the system can determine clusters in which users are the most likely to connect with the service, or the most likely to disconnect from the service.

The description of FIG. 8 included identifications of recommended services. Additionally, the user interface 800 can be configured to provide information describing user churn information, and include services that users included in the selected cluster 802 are likely to disconnect from (e.g., the most likely services users will disconnect from). In this way, the reviewing user can select a particular service, and the graphical representation of an area 826 can identify concentrations of users that are at risk of disconnecting from the selected service. The reviewing user can then contact employees, or agents, associated with particular concentrations of users, and direct them to contact the users (e.g., with rebate information, or other perks).

Each of the processes, methods, and algorithms described in the preceding sections may be embodied in, and fully or partially automated by, code modules executed by one or more computer systems or computer processors comprising computer hardware. The code modules (or "engines") may be stored on any type of non-transitory computer-readable medium or computer storage device, such as hard drives, solid state memory, optical disc, and/or the like. The systems and modules may also be transmitted as generated data signals (for example, as part of a carrier wave or other analog or digital propagated signal) on a variety of computer-readable transmission mediums, including wireless-based and wired/cable-based mediums, and may take a variety of forms (for example, as part of a single or multiplexed analog signal, or as multiple discrete digital packets or frames). The processes and algorithms may be implemented partially or wholly in application-specific circuitry. The results of the disclosed processes and process steps may be stored, persistently or otherwise, in any type of non-transitory computer storage such as, for example, volatile or non-volatile storage.

In general, the terms "engine" and "module", as used herein, refer to logic embodied in hardware or firmware, or to a collection of software instructions, possibly having entry and exit points, written in a programming language, such as, for example, Java, Lua, C or C++. A software module may be compiled and linked into an executable program, installed in a dynamic link library, or may be written in an interpreted programming language such as, for example, BASIC, Perl, or Python. It will be appreciated that software modules may be callable from other modules or from themselves, and/or may be invoked in response to detected events or interrupts. Software modules configured for execution on computing devices may be provided on a computer readable medium, such as a compact disc, digital video disc, flash drive, or any other tangible medium. Such software code may be stored, partially or fully, on a memory device of the executing computing device, such as the user determination system 100, for execution by the computing device. Software instructions may be embedded in firmware, such as an EPROM. It will be further appreciated that hardware modules may be comprised of connected logic units, such as gates and flip-flops, and/or may be comprised of programmable units, such as programmable gate arrays or processors. The modules described herein are preferably implemented as software modules, but may be represented in hardware or firmware. Generally, the modules described herein refer to logical modules that may be combined with other modules or divided into sub-modules despite their physical organization or storage. Electronic Data Sources can include databases, volatile/non-volatile memory, and any memory system or subsystem that maintains information.

The various features and processes described above may be used independently of one another, or may be combined in various ways. All possible combinations and subcombinations are intended to fall within the scope of this disclosure. In addition, certain method or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state.

The example blocks or states may be performed in serial, in parallel, or in some other manner. Blocks or states may be added to or removed from the disclosed example embodiments. The example systems and components described herein may be configured differently than described. For example, elements may be added to, removed from, or rearranged compared to the disclosed example embodiments.

Conditional language used herein, such as, among others, "can," "could," "might," "may," "for example," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without author input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list. Conjunctive language such as the phrase "at least one of X, Y and Z," unless specifically stated otherwise, is otherwise understood with the context as used in general to convey that an item, term, etc. may be either X, Y or Z. Thus, such conjunctive language is not generally intended to imply that certain embodiments require at least one of X, at least one of Y and at least one of Z to each be present.

The term "a" as used herein should be given an inclusive rather than exclusive interpretation. For example, unless specifically noted, the term "a" should not be understood to mean "exactly one" or "one and only one"; instead, the term "a" means "one or more" or "at least one," whether used in the claims or elsewhere in the specification and regardless of uses of quantifiers such as "at least one," "one or more," or "a plurality" elsewhere in the claims or specification.

The term "comprising" as used herein should be given an inclusive rather than exclusive interpretation. For example, a general purpose computer comprising one or more processors should not be interpreted as excluding other computer components, and may possibly include such components as memory, input/output devices, and/or network interfaces, among others.

While certain example embodiments have been described, these embodiments have been presented by way of example only, and are not intended to limit the scope of the disclosure. Thus, nothing in the foregoing description is intended to imply that any particular element, feature, characteristic, step, module, or block is necessary or indispensable. Indeed, the novel methods and systems described herein may be embodied in a variety of other forms; furthermore, various omissions, substitutions, and changes in the form of the methods and systems described herein may be made without departing from the spirit of the inventions disclosed herein. The accompanying claims and their equivalents are intended to cover such forms or modifications as would fall within the scope and spirit of certain of the inventions disclosed herein.

Any process descriptions, elements, or blocks in the flow diagrams described herein and/or depicted in the attached figures should be understood as potentially representing modules, segments, or portions of code which include one or more executable instructions for implementing specific logical functions or steps in the process. Alternate implementations are included within the scope of the embodiments described herein in which elements or functions may be deleted, executed out of order from that shown or discussed, including substantially concurrently or in reverse order, depending on the functionality involved, as would be understood by those skilled in the art.

It should be emphasized that many variations and modifications may be made to the above-described embodiments, the elements of which are to be understood as being among other acceptable examples. All such modifications and variations are intended to be included herein within the scope of this disclosure. The foregoing description details certain embodiments of the invention. It will be appreciated, however, that no matter how detailed the foregoing appears in text, the invention can be practiced in many ways. As is also stated above, it should be noted that the use of particular terminology when describing certain features or aspects of the invention should not be taken to imply that the terminology is being re-defined herein to be restricted to including any specific characteristics of the features or aspects of the invention with which that terminology is associated.

What is claimed is:

1. A computerized method implemented by one or more processors, the method comprising:
   accessing information identifying a plurality of unique users, the unique users being determined based on user records stored in one or more electronic data sources, wherein at least some user records associated with a first unique user included at least some different information describing the first unique user;
   determining a recommended service for the first unique user, wherein the first unique user is associated with a cluster of unique users having a common characteristic, and wherein the recommended service is determined based at least on services associated with unique users of the cluster to which the first unique user is not associated, wherein the recommended service is based on a ranking of the services with respect to the cluster of unique users, and wherein the ranking is based on information specific to the first unique user; and
   providing, for presentation in an interactive user interface, summary data describing at least the first unique user.

2. The computerized method of claim 1, further comprising:
   determining that the first unique user is associated with the user records which included at least some different information, the determination being based on comparisons between the information describing the first unique user, wherein the comparisons exceed a threshold measure of similarity.

3. The computerized method of claim 2, wherein the information describing the first unique user comprises identifying information, and wherein the comparisons are based on analyses of distinctions between the identifying information.

4. The computerized method of claim 2, wherein the information describing the first unique user comprises a name, and wherein a comparison is associated with a measure between the name as included in a first user record and a second user record of the at least some user records.

5. The computerized method of claim 1, wherein the ranking is based on respective numbers of remaining unique users associated with each service.

6. The computerized method of claim 1, wherein the summary data may include one or more of services associated with the first unique user or analyses of descriptive text associated with interactions with the first unique user.

7. The computerized method of claim 1, wherein the interactive user interface:
  presents a map of a geographic area that includes the cluster of unique users, wherein the map identifies concentrations of the cluster of unique users;
  receives a selection of the recommended service; and
  updates the map of the geographic region to include concentrations of one or more of the unique users included in the cluster which are not connected with the recommended service.

8. A system comprising one or more processors and non-transitory computer storage media storing instructions that when executed by the one or more processors, cause the processors to perform operations comprising:
  accessing information identifying a plurality of unique users, the unique users being determined based on user records stored in one or more electronic data sources, wherein at least some user records associated with a first unique user included at least some different information describing the first unique user;
  determining a recommended service for the first unique user, wherein the first unique user is associated with a cluster of unique users having a common characteristic, and wherein the recommended service is determined based at least on services associated with unique users of the cluster to which the first unique user is not associated, wherein the recommended service is based on a ranking of the services with respect to the cluster of unique users, and wherein the ranking is based on information specific to the first unique user; and
  providing, for presentation in an interactive user interface, summary data describing at least the first unique user.

9. The system of claim 8, wherein the operations further comprise:
  determining that the first unique user is associated with the user records which included at least some different information, the determination being based on comparisons between the information describing the first unique user, wherein the comparisons exceed a threshold measure of similarity.

10. The system of claim 9, wherein the information describing the first unique user comprises identifying information, and wherein the comparisons are based on analyses of distinctions between the identifying information.

11. The system of claim 9, wherein the information describing the first unique user comprises a name, and wherein a comparison is associated with a measure between the name as included in a first user record and a second user record of the at least some user records.

12. The system of claim 8, wherein the ranking is based on respective numbers of remaining unique users associated with each service.

13. The system of claim 8, wherein the summary data may include one or more of services associated with the first unique user or analyses of descriptive text associated with interactions with the first unique user.

14. The system of claim 8, wherein the interactive user interface:
  presents a map of a geographic area that includes the cluster of unique users, wherein the map identifies concentrations of the cluster of unique users;
  receives a selection of the recommended service; and
  updates the map of the geographic region to include concentrations of one or more of the unique users included in the cluster which are not connected with the recommended service.

15. Non-transitory computer storage media storing instructions that when executed by a system of one or more processors, cause the processors to perform operations comprising:
  accessing information identifying a plurality of unique users, the unique users being determined based on user records stored in one or more electronic data sources, wherein at least some user records associated with a first unique user included at least some different information describing the first unique user;
  determining a recommended service for the first unique user, wherein the first unique user is associated with a cluster of unique users having a common characteristic, and wherein the recommended service is determined based at least on services associated with unique users of the cluster to which the first unique user is not associated, wherein the recommended service is based on a ranking of the services with respect to the cluster of unique users, and wherein the ranking is based on information specific to the first unique user; and
  providing, for presentation in an interactive user interface, summary data describing at least the first unique user.

16. The computer storage media of claim 15, wherein the operations further comprise:
  determining that the first unique user is associated with the user records which included at least some different information, the determination being based on comparisons between the information describing the first unique user, wherein the comparisons exceed a threshold measure of similarity.

17. The computer storage media of claim 16, wherein the information describing the first unique user comprises identifying information, and wherein the comparisons are based on analyses of distinctions between the identifying information.

18. The computer storage media of claim 16, wherein the information describing the first unique user comprises a name, and wherein a comparison is associated with a measure between the name as included in a first user record and a second user record of the at least some user records.

19. The computer storage media of claim 15, wherein the ranking is based on respective numbers of remaining unique users associated with each service.

20. The computer storage media of claim 15, wherein the interactive user interface:
  presents a map of a geographic area that includes the cluster of unique users, wherein the map identifies concentrations of the cluster of unique users;
  receives a selection of the recommended service; and
  updates the map of the geographic region to include concentrations of one or more of the unique users included in the cluster which are not connected with the recommended service.

* * * * *